Figure 1A:
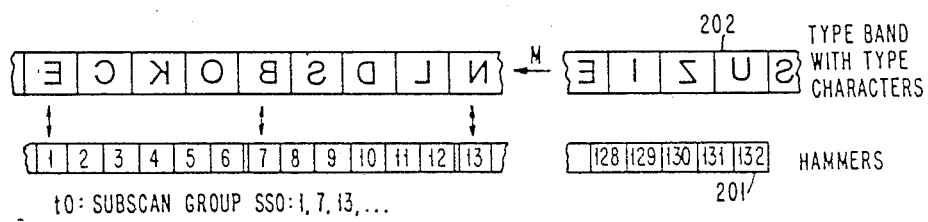

United States Patent [19]
Bublitz

[11] Patent Number: 4,764,039
[45] Date of Patent: Aug. 16, 1988

[54] METHOD FOR CONTROLLING LINE PRINTERS COMPRISING A REVOLVING TYPE BAND AND A PRINT HAMMER BANK

[75] Inventor: Hermann R. Bublitz, Böblingen, Fed. Rep. of Germany

[73] Assignee: International Business Machines Corporation, Armonk, N.Y.

[21] Appl. No.: 904,405

[22] Filed: Sep. 8, 1986

[30] Foreign Application Priority Data

Sep. 13, 1985 [EP] European Pat. Off. ........ 85111565.9

[51] Int. Cl.$^4$ .............................................. B41J 1/20
[52] U.S. Cl. .................................. 400/146; 101/93.14; 364/519
[58] Field of Search .................. 101/111, 93.13, 93.48, 101/93.14, 93.15; 400/146; 364/519

[56] References Cited

U.S. PATENT DOCUMENTS

| | | | |
|---|---|---|---|
| 4,218,754 | 8/1980 | Schaeffer | 101/93.14 |
| 4,273,041 | 6/1981 | Bolcavage et al. | 101/93.14 |
| 4,275,653 | 6/1981 | Bolcavage et al. | 101/93.14 |
| 4,457,229 | 7/1984 | Carrington et al. | 101/93.14 |
| 4,597,328 | 7/1986 | Carrington et al. | 101/93.14 |
| 4,621,343 | 11/1986 | Fujieda et al. | 364/519 |

FOREIGN PATENT DOCUMENTS

142378 9/1982 Japan .................................. 400/146

*Primary Examiner*—William Pieprz
*Attorney, Agent, or Firm*—John S. Gasper

[57] ABSTRACT

Method for controlling line printers comprising a revolving type band (400) and a print hammer bank for precalculating the firing times of the print hammers.

The type band generally comprises equidistantly spaced scannable time marks (402) and a reference mark (501).

The character spacing on the type band is subject to a coarse raster pitch ΔT which is derived from the time mark pitch.

The time mark positions are associated with coarse raster positions.

The arrangement of the print hammers is subject to a coarse raster pitch ΔT and a fine raster pitch ΔT. Coarse and fine raster values are defined as time values.

The hammers are sorted according to the fine raster values and their firing times are calculated by means of a special algorithm according to the order resulting from the sort step. The calculated values are entered in a first table (600) (comprising a field for each coarse raster value) and in a second table (700) (in which the fine raster values associated with the coarse raster value are entered).

The printer control method permits
different character spacings on the type band and variable print hammer pitches,
compensating for flight time variations of the hammers, left- and right-shifting characters and dot raster printing (even with different greytones).

9 Claims, 5 Drawing Sheets

| HAMMER NO. | TIME SPACING FROM HAMMER NO.1 | |
|---|---|---|
| | ΔT | Δt |
| 1 | 0 | 0 |
| 2 | 0 | 9 |
| 3 | 8 | 1 |
| 4 | 12 | 3 |
| 5 | 16 | 5 |
| 6 | 20 | 5 |
| ⋮ | ⋮ | ⋮ |
| 129 | 512 | 2 |
| 130 | 516 | 0 |
| 131 | 520 | 1 |
| 132 | 524 | 4 |
FIG. 8
| HAMMER NO. | TIME SPACING FROM HAMMER NO.1 | |
|---|---|---|
| | ΔT | Δt |
| 1 | 0 | 0 |
| 130 | 516 | 0 |
| 3 | 8 | 1 |
| 131 | 520 | 1 |
| 129 | 512 | 2 |
| 4 | 12 | 3 |
| 132 | 524 | 4 |
| 5 | 16 | 5 |
| 2 | 0 | 9 |
| ⋮ | ⋮ | ⋮ |
FIG. 9
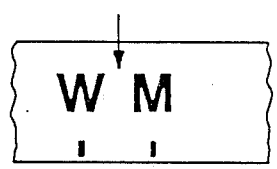
FIG. 10A
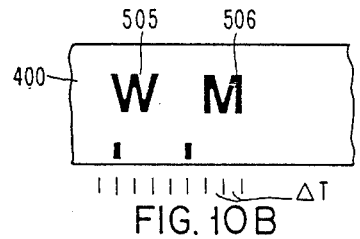
FIG. 10B
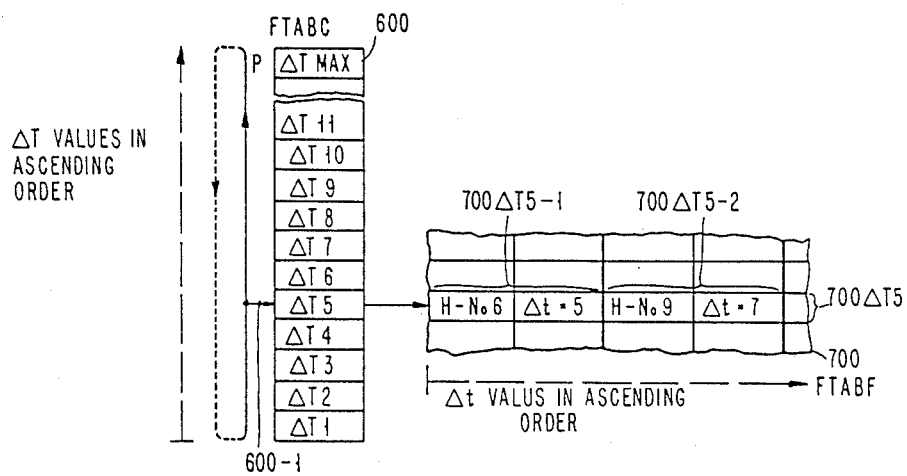
FIG. 11

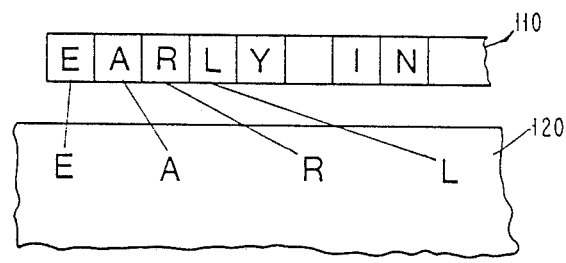
FIG. 12
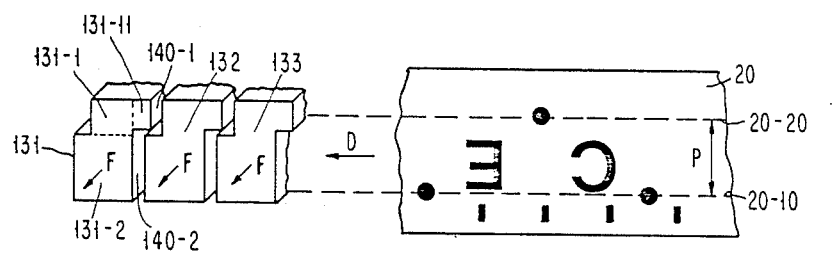
FIG. 13
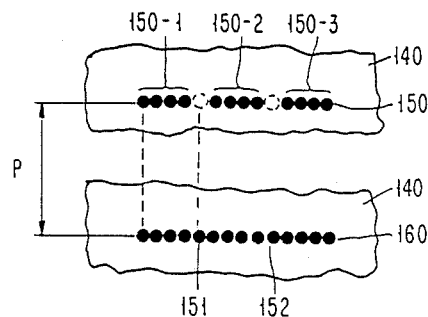
FIG. 14A
FIG. 14B

METHOD FOR CONTROLLING LINE PRINTERS COMPRISING A REVOLVING TYPE BAND AND A PRINT HAMMER BANK

The invention concerns a method for controlling line printers comprising a revolving type carrier which is moved past a row of print elements arranged in a bank and associated with the print positions, for precalculating the actuation times of the print elements (e.g., the firing times of print hammers) for printing particular characters at particular print positions of a record carrier, wherein the type carrier comprises equidistant scannable time marks and a reference mark.

The invention also concerns an arrangement for implementing the method according to the invention.

The invention as well as the prior art will be explained below with respect to an example of an impact line printer comprising a revolving type band with the characters to be printed. The characters are printed at predetermined print positions by means of print hammers arranged in a print hammer bank. The actuation times of the print hammers are referred to as firing times.

Known printer control methods may be divided into two categories.

There is a first category (comprising the gang firing printer control method—as will be described by means of FIG. 1—and the ripple firing printer control method—as will be described by means of FIG. 3) wherein as the type band revolves it is decided immediately before printing whether a character can be printed at a predetermined position. Such a decision which is taken electronically requires a certain time. High print speeds necessitate minimum decision times. Unless such times are minimized still further, there will be no further increase in print speed, so that alternative control methods will have to be devised for even faster printers.

The printer control methods of the second category precalculate the print hammer firing times for line printing by means of microprocessors.

The hammer firing times are essentially precalculated during the line advance, but there are time limits such as those imposed in particular by the time-consuming sort step for the precalculated firing times, which prevent the print speed from being increased further.

Thus, any further fine rastering of the firing times, as would be necessary, for instance, for compensating for flight time variations, is impossible. However, as the trend in printer development is towards higher print speeds at which hammer flight time variations are more detrimental than at low speeds, a method will have to be provided which nevertheless permits associating the firing times with a fine time raster. (For only in that way is it possible to fine-correct the firing times.) What should be avoided however are time-consuming sort steps.

Another task to be accomplished by the invention is to provide a printer control method which, in addition to fine rastering the firing times, permits the type characters to be left- or right-shifted. As a result, flight time variations may be compensated and dot characters be printed in a non-overlapping or an overlapping fashion, as is necessary, for instance, for halftone images.

A further task is that the method according to the invention should permit different character spacings on the type band. This allows broad, adjacent characters to be spaced farther apart than has been possible on type bands with equidistantly spaced characters and prevents type bands from breaking at the locations of broad, adjacent characters.

These tasks are favourably accomplished by the measures according to the characterization of claim 1. Further embodiments of the method according to the invention may be seen from the subclaims. A preferred embodiment of an arrangement for implementing the method according to the invention for gapless dot raster printing is characterized in claims 6 and 7.

Figure 1B:
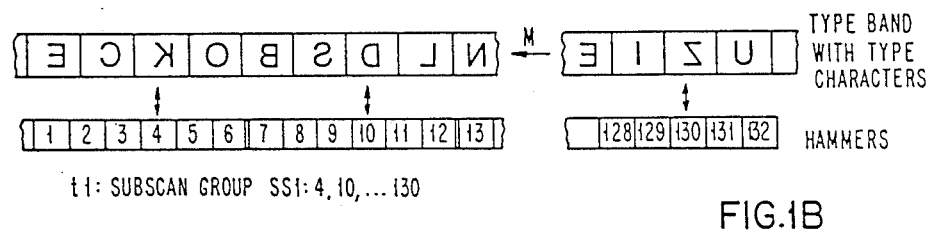
Figure 2:
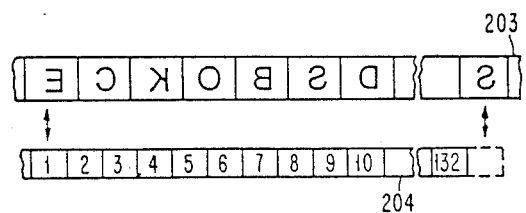
Figure 3:
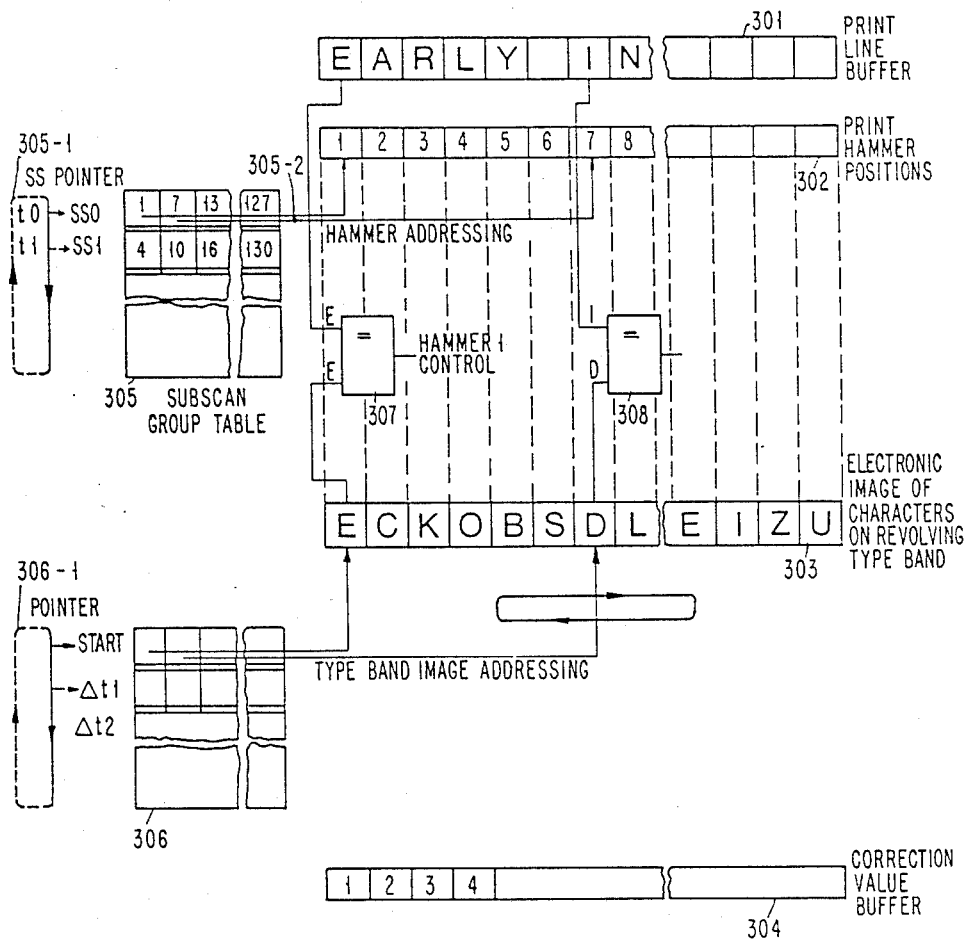
Figure 4:
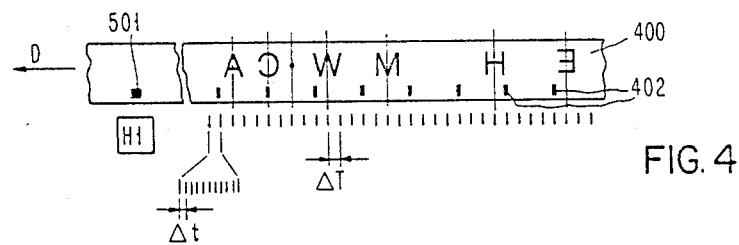
Figure 5:
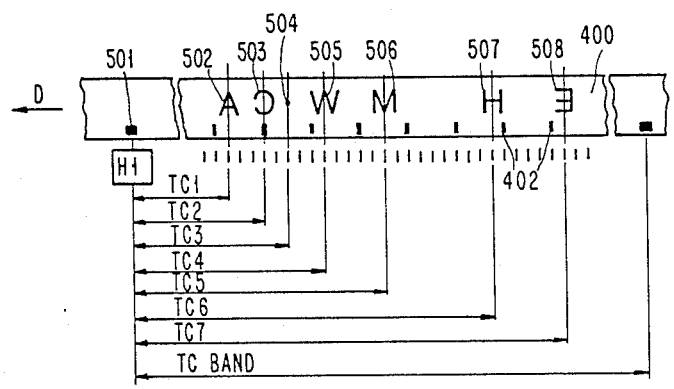
Figure 6:
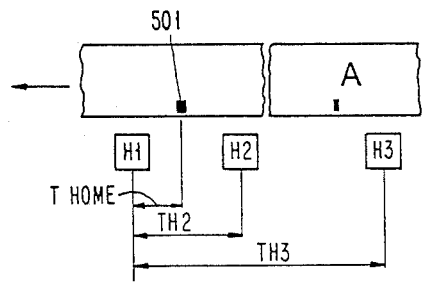
Figure 7:
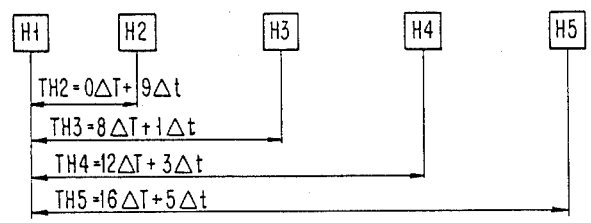

An embodiment of the invention will be described in detail below with reference to drawings, in which FIGS. 1A and 1B are schematics of the print hammer positions in a print hammer bank comprising a type band with type characters moving past the print positions at different times, for explaining the terms subscan time and subscan groups for the gang firing printer control method, FIG. 2 is a schematic of the print hammer positions and a type band with type characters moving past them, for explaining the ripple firing printer control method, FIG. 3 is a schematic of a printer control with table-driven hammer addressing, table-driven type band image addressing and a print line buffer, taking account of compare operations for firing the respective hammers, FIG. 4 is a schematic of a type band with differently spaced characters, the character spacings being either identical or amounting to a multiple of a coarse raster obtained by subdividing the time mark raster, FIG. 5 is a schematic of the time spacing (coarse raster) of the characters on the type band relative to the home pulse assumed to occur at the position of the first print hammer, FIG. 6 is a schematic of the time spacing (coarse and fine raster) of the position of an arbitrary print hammer relative to the position of the first print hammer, taking account of the momentary time spacing of the home mark from the first print hammer position, FIG. 7 is an example of the time spacings of print hammer positions relative to a reference position, FIG. 8 is a table showing the time spacing of the print hammer positions relative to the first print hammer position, FIG. 9 is a table showing the print hammer positions sorted according to fine raster values, FIGS. 10A and 10B are schematic sectional representations of a type band with equidistant time marks and an assumed coarse raster for different character spacings, FIG. 11 is a schematic showing tables for the firing times with coarse and fine raster data, FIG. 12 is a schematic of the output of the line information stored in the print buffer, FIG. 13 is a schematic sectional representation of specially designed print hammers and a type band with two rows of dot characters, FIGS. 14A and 14B are schematic sectional representations of a type carrier showing a dot line with gaps (FIG. 14A) printed by means of the arrangement of FIG. 13 and a gapless dot line (14B) after advance of the record carrier.

In high-speed printers with revolving type carriers—such as chains or bands—and actuating elements (print elements), subsequently referred to as print hammers or hammers, associated with the individual print positions, the printing times of the individual print hammers arranged in a hammer bank have to be determined for line-by-line information output. This is done as a function of the characters to be printed at the individual print positions. Such printer controls work from a print hammer pitch that is slightly smaller than that of the characters on the revolving type carrier.

A principle of an operating sequence is shown in FIGS. 1A and 1B for the gang firing printer control method. The print hammer positions are designated as 1, 2, 3 to 132. At the time t0 (starting or reference time) in FIG. 1A, the type band 202 with the type characters moving past the print hammer bank 201 in the direction of arrow M assumes a position relative to the print hammer bank 201 in which the print hammers 1, 7, 13, etc. are aligned with the characters E, B, N (alignment being marked by a double arrow). The term starting time is not to be confused with the time it takes to accelerate the type band to the speed necessary for printing. At the time t0 it is possible to fire the hammers 1, 7, 13, etc. associated with subscan group SS0 and to print the type characters of the type band aligned with them.

FIG. 1B shows the position of the type band relative to print hammer bank 201 at the time t1. At that time the type band has moved relative to its position according to FIG. 1A such that the print hammers 4, 10, . . . , 130 are aligned with type characters K, D, . . . , Z. Thus, the subscan group SS1 associated with the time t1 comprises the hammers 4, 10, . . . , 130. The time difference t1−t0 is referred to as subscan time Δt1. This time passes if after alignment of a hammer to a type character of the type band another print hammer is aligned to another type character while the type band continues moving. In printer control terminology, the subscan times are in each case related to the starting time t0: Δt1=t1−t0, Δt2=t2−t0, Δt3=t3−t0, etc. At the subscan times, particular (subscan) groups of the hammers are aligned with characters facing them, so that at these times printing could be effected.

The print hammer pitch (FIGS. 1A and 1B) relative to the given character pitch on the type band permits firing several hammers of the print hammer bank at particular times, such as START, Δt1, Δt2. This principle is generally referred to as gang firing and is used as a printer control method, for example, for IBM printers 3262 and 4245, with the firing times of the print hammers being calculated under the control of a microprogram.

Another printer control method is the ripple firing method. Characteristic of this method is that only one hammer of the print hammer bank is fired at any particular time. For that purpose, the character pitch on the type band 203 is chosen relative to the print hammer pitch in the print hammer bank 204 such that at any particular time only one character of the type band is aligned with a print hammer. The print hammer positions are again designated as 1, 2, 3, . . . , 132. At the time shown in FIG. 2, the character E is aligned with print hammer position 1, as marked by a double arrow. Examples of printers using the ripple firing control method are IBM 1403, IBM 3211, IBM 3203. In these printers, the characters to be printed are compared with an electronic image of the type band characters stored in a RAM (Random Access Memory).

FIG. 3 is a schematic of a gang firing control comprising table-driven hammer addressing, table-driven type band image addressing and a print line buffer and using compare operations for firing the respective print hammers. The characters for a line to be printed are stored in print line buffer 301. The hammer positions of the hammer bank 302 are designated as 1 to 132. The hammers are addressed via associated address lines 305-2. A cyclic storage 303 serves to store the electronic image of the revolving type band. The print hammers that may be fired at particular subscan times are listed line-by-line in a subscan group table 305. The rows of this table are cyclically addressed by a subscan pointer (SS pointer) which addresses the lines of the table in the arrow-marked direction from one subscan time to another. At the starting time t0, the subscan pointer points at subscan group SS0 in which hammers 1, 7, 13 and 127 are addressed.

In the print hammer/type character alignment table 306 the fields of the cyclic storage 303 addressed at the different subscan times via address line 306-2 are those whose characters are in alignment with particular print hammers (table 305) for printing. The rows in table 306 are addressed by a pointer 306-1 marked PP which at the times START, Δt1, Δt2 cyclically moves in the arrow-marked direction. At the time t0, hammers 1, 7, 13, . . . , 127 are addressed (with the SS pointer pointing at row SS0 in table 305). At the same time t0, the PP pointer 306-1 points at the first row of table 306. This table serves to address the fields of the cyclic storage 303 which at that time contain the characters E, D, etc. A comparison (307) on equal of the character E to be printed at the first print position of the line (by print hammer 1) (see 301) with the character E aligned at that time with the first print hammer position in the cyclic storage 303 causes the print hammer for print hammer position 1 to be fired and character E to be printed at the first print position. Such a comparison is not only made for the first but also for the seventh, the thirteenth, . . . , the one hundred-and-twentieth print hammer simultaneously. (The compare circuits are designated as 307, 308, . . . ) At the time t1, SS pointer 305-1 points at the SS1 group in table 305 and PP pointer 306-1 at the second row of table 306. The above-described address and compare functions at the time t1 are performed analogously to those at the time t0. Flight time variations of individual print hammers are compensated by delaying or advancing their firing times. The data necessary for changing the individual firing times are stored in a correction value buffer 304. Correction values are predetermined for each print hammer position designated as 1, 2, 3, . . . , 132 in 304. If, for example, the flight time of print hammer position 7 is to be corrected, the firing of the respective print hammer is delayed or advanced as a function of the predetermined correction value.

In the case of the example described below for explaining the method according to the invention for controlling a line printer, the print elements take the form of print hammers. The actuation times of the print hammers are generally referred to as firing times. A type band is used as a revolving type carrier.

FIG. 4 is a schematic of a type band 400 with an equidistant time mark (402) pitch. The spacing of adjacent characters may be different. It corresponds to a coarse raster ΔT or a multiple thereof.

The terms time spacings or (time) rasters subsequently used imply that any spacings and assumed raster positions on the type band are length or position data.

At a constant number of type band revolutions, such data may also be defined as time values. Thus, for instance, the time spacing between the home mark 501 and character E (FIGS. 4 and 5) is the time in which the type band moves by the distance between 501 and E.

Type band 400, shown in the sectional view in FIG. 4, is assumed to move in the direction D. By scanning the time marks 402 by a scanning element at a preselected position (scanning position) past which the revolving type band moves, time mark pulses are obtained which in the printer are electronically subdivided into a coarse time raster $\Delta T$ and a fine time raster $\Delta t$. In addition, the type band is provided with a home mark 501 which is scanned to obtain the home pulse. In the printer control, the pulses obtained by scanning the time marks are related to the home pulse. The time difference between the home mark and the time marks and the characters, respectively, is subject to the coarse time raster.

It is pointed out that the actuation times of the hammers are chosen according to a fine time raster.

FIG. 5 shows the time spacing of the characters on the type band relative to the home pulse which is assumed to occur at position H1 of the first print hammer. It is also assumed that the type band 400 moves at constant speed in the arrow-marked direction D. Home mark 501, from which the home pulse is derived, is assumed to be at position H1 of the first print hammer where also the scanning element for the time marks 402 is located. The time passing between the occurrence of the home pulse and character A 502 is TC1 (in the coarse time raster) and between the occurrence of the home pulse and character C 503 TC2, etc. The time for a complete revolution of the type band calculated from the time of first occurrence of the home pulse to its renewed occurrence is designated as TC Band. Time values TC1, TC2, TC3, TC4, TC5, etc. are stored for each type band 400 in a table Tab T. The time values in that table are equal to or integral multiples of $\Delta T$.

FIG. 6 is a schematic of the time spacing of the position of an arbitrary print hammer relative to the first print hammer position, taking account of the momentary time spacing T Home of the home mark 501 from the first print hammer position H1.

The (print) positions of the second and the third print hammer are designated as H2 and H3.

According to FIG. 5, character A could be printed at the first print hammer position H1 after the time TC1. For determining the printing time of character A at the second hammer position H2, the time TC1 has to be advanced by the time TH2 (FIG. 6) which is the time it takes the type band to move from hammer position H2 to hammer position H1. It is assumed for this purpose that the home mark has already reached the first print hammer position H1. If it is at another position, say, a position defined by the time T Home (FIG. 6), the firing time for character A at the second print position H2 is delayed by T Home. In other words, if the time spacing of an arbitrary hammer relative to hammer position H1 is known, it is possible to predetermine for each hammer position the print (firing) time for a particular character as a function of the values TC1, TC2, TC3, TC4, ... and the value T Home. For precalculating the firing times for all hammers according to the hammer order, the printing times are not sorted in an ascending order, as is necessary for line printing. For time reasons, it would be impracticable to sort the calculated values for high-speed printers.

The method according to the invention permits however calculating the firing times for all print hammer positions in a time-sorted order.

The print hammer pitch is subject to a coarse time raster $\Delta T$ and a fine time raster $\Delta t$.

FIG. 7 is a schematic of an example of the "time spacings" of different hammer positions in the print hammer bank. (The time spacing of two hammer positions is the time it takes the type band to move from one reference hammer position to another.) Thus, the time spacing TH4 between the hammers H4 and H1 is twelve coarse time raster values $12\Delta T$ and three fine time raster values $3\Delta t$ (in the example, ten fine time raster values are assumed to correspond to one coarse time raster value).

The time THn which passes as the type band moves from the nth print position Hn to the reference print position H1 is determined from the coarse and the fine time raster values ($\Delta T$ and $\Delta t$, respectively).

FIG. 8 is a table showing the time spacing of the individual print hammer positions in the print hammer bank relative to the first print hammer position. The print hammer positions are marked by print hammer numbers H.Nos. in an ascending order 1, 2, 3, 4, ... The time spacing of the individual print hammer positions relative to hammer position H.No. 1 is defined by a coarse raster value $\Delta T$ and a fine time raster value $\Delta t$. Non-equidistant hammer arrangements are also possible.

(Example: The time spacing of hammer position 3 from hammer position 1 is $\Delta T = 8$ and $\Delta t = 1$.)

This table is a characteristic of the completely assembled print hammer bank. The time spacings of the print hammer positions can be determined by known methods.

This table (FIG. 8) is used as a basis for the method according to the invention, which is described below for controlling line printers.

Based on the information of the table according to FIG. 8, a new table (FIG. 9) is formed in a single sort step. The table of FIG. 9 shows the print hammer positions of the table of FIG. 8 sorted according to fine time raster values $\Delta t$. Sorting is effected in an ascending order of the fine time raster values $\Delta t$. The print hammer positions are again marked by hammer numbers H.Nos. According to FIG. 8, the time spacing of a print hammer position relative to a first print hammer position is defined by coarse time raster values $\Delta T$ and fine time raster values $\Delta t$. Column $\Delta t$ shows that there is an ascending sort sequence for all hammer positions (at least to the extent to which they are listed in the table of FIG. 8). For identical $\Delta t$ values there is first the lower hammer number followed by the higher hammer number.

Based on the table of FIG. 9, the printer control method according to the invention permits calculating the firing times without any further sorting of the firing times of the totality of the print positions. For precalculating the firing times, a firing table FTABC 600 and a firing table FTABF 700 according to FIG. 11 are formed for the coarse time raster values $\Delta T$ and the fine time raster values $\Delta t$, respectively. The values $\Delta T$ and $\Delta t$ correspond to those of FIGS. 4, 8 and 9.

According to FIG. 11, a firing table FTABC 600 is formed for the coarse time raster values $\Delta T$ and a firing table FTABF 700 for the fine time raster values $\Delta t$. Values $\Delta T$ and $\Delta t$ correspond to those of FIG. 4. Table 600 contains in ascending order fields for all possible $\Delta T$ values: $\Delta T1$, $\Delta T2$, $\Delta T3$, etc. This table is cyclically passed by an address pointer 600-1 in the arrow-marked direction P at the coarse time raster clock. If the pointer (after calculation of the firing times and their entry in tables 600 and 700) encounters an entry in a table field, i.e., data specifying, for example, that during the time $\Delta T5$ one or several print hammers are to be fired, table 700 is addressed whose subfields in the row field 700 $\Delta T5$ associated with the time $\Delta T5$ contain entries concerning hammer numbers (H.Nos.) and fine time raster values $\Delta t$ for the hammer(s) to be fired. Similar to the row fields of table 600, the entries in row field 700 $\Delta T5$ are listed in ascending order. The first subfield 700 $\Delta T5$-1 of row field 700 $\Delta T5$ contains an example of a hammer to be fired, in this case hammer no. 6, and the fine time raster value $\Delta t=5$, whereas the hammer to be fired at the fine time raster value $\Delta t=7$ is designated as 9 in subfield 700 $\Delta T5$-2.

If several hammers are to be fired simultaneously at a particular time $\Delta t$, these hammers are listed in the table field associated with that time.

Another table principle than that shown in FIG. 11 is known from the precalculation of the firing times for the gang firing method (IBM printers 4245 and 3262), which uses a subscan table that is cyclically passed by a pointer at the subscan clock. If one or several hammers are to be fired simultaneously in a subscan, a pointer from the subscan table points at a further table containing entries on the hammers to be simultaneously fired in that subscan time.

However, the latter table principle requires an equidistant character pitch on the type band and an equidistant hammer pitch.

Identical character spacings (from one character centerline to another) on the type band have the great disadvantage that type bands with broad characters, such as W and M (FIG. 10A), arranged closely adjacent to each other easily break at the arrow-marked point (on the illustrated bands the characters are associated with the time marks). Therefore, it is sometimes desirable to increase the character spacings on the type band so that broad characters are more widely spaced from each other (FIG. 10B). This can be readily done by increasing the spacing of two adjacent broad characters such that it amounts to a multiple of the coarse time raster ($\Delta T$). The firing times are calculated in the order of the hammers of table 9 and are entered in tables 600 and 700.

The values of the firing times are listed relative to the time at which reference mark (501) is at reference print position H1.

Calculation of the firing time Tf of a print hammer at the nth print position Hn (n=1, 2, 3, 4, ...) for printing the pth character Cp (p=1, 2, 3, 4, ...) of the type band (with the characters being consecutively numbered relative to reference mark 501) is subject to the subsequent relation, as shown in FIGS. 5 and 6.

$$Tf = TCp - THn$$

for a positive difference value TCP−THn $$Tf = TC \text{ Band} + (TCp - THn)$$

for a negative difference value TCp−THn which is subtracted from TC Band.

TC band is the time it takes the band to perform one revolution. TCp is the time that passes as the pth character moves from its respective momentary position (at which the home mark is at the location of the reference print position H1) to the reference position H1, THn being the time that passes as the type band moves from the nth print position Hn to reference print position H1.

T Home is the momentary time spacing of the reference mark (501) from reference print position H1.

The TCp times for the characters on the type band are defined in the coarse time raster.

The time data for the spacing of an arbitrary print hammer position from a reference hammer position (hammer position H1 in the example) includes both the coarse time raster $\Delta T$ and the fine time raster $\Delta t$. Based on a single presort step of the print hammer positions according to the fine time raster values $\Delta t$ (FIG. 9) the firing times are calculated in the $\Delta t$ sort sequence of the hammers. The calculated firing time for each print hammer position is entered in fields of tables 600 and 700 (FIG. 11) provided for that purpose. For a particular $\Delta T$ coarse time raster value the field of table 600 associated with that value is directly addressable, the data of an associated $\Delta t$ fine time raster value are entered in the next free subfield of the row field of table 700 associated with the $\Delta T$ value. This avoids sorting the firing times. After all firing times have been calculated and entered, they are listed in an ascending order according to the given structure of tables 600 and 700 (table 11).

Precalculation of the firing times for the information in print line buffer 110 will be described below by way of an example. It is assumed that according to FIG. 12, character E is to be printed at the first print position, character A at the second print position, character R at the third print position, etc. of the record carrier 120. The characters in the print line buffer are consecutively ordered, without considering the character spacings on the type band and different hammer spacings, if any, respectively.

The firing time for each character in the print line buffer is precalculated according to the relation $$Tf = TCp - THn$$

for a positive difference value TCP−THn $$Tf = TC \text{ Band} + (TCp - THn)$$

for a negative difference value TCp−THn, which is subtracted from TC Band.

As these firing times (in the order of the hammers according to FIG. 9) are calculated in an ascending $\Delta t$ order, entries are made in tables 600 and 700.

If several identical characters are provided on the band, Tf is calculated several times, selecting from the various values thus calculated that which comes closest to the planned starting time of the print operation. Selection may be reduced by known methods that do not form part of this application.

The characters stored in the print line buffer are printed as a function of the precalculated values according to the entries in tables 600 and 700. Table 600 is cyclically passed by a pointer at the clock of the $\Delta T$ values. If entries for one or several hammers to be fired exist for a $\Delta T$ value, a branch is taken from table 600 to 700, actuating the hammers listed in that table in the order of the ascending $\Delta T$ values. (Compare operations 307, 308, as are required for the printer control according to FIG. 3, are eliminated in this case.)

The printer control method according to the invention permits for the first time to control printers using different character spacings on the type band and having variable print hammer pitches.

By fine time rastering the TH values it is possible to readily compensate for hammer flight time variations in synchronism with the coarse time and the fine time raster, respectively. Compensation is effected by suitably changing the THn values.

It is also possible to precalculate the firing times for the ripple firing control method of FIG. 2, which has not been practicable so far for time reasons (sort steps).

By changing the coarse time raster values ΔT in table 600 the above-described printer control method also permits printing characters left- or right-shifted from their original central print hammer position aligned with the coarse raster.

Thus by using special type bands comprising, in addition to the usual engraved characters, a plurality of dots in two tracks (FIG. 13), it is possible to have a raster dot print output with overlapping dots. It is furthermore possible to reproduce images with different greytones, for which purpose it is assumed that the advance movement of the record carrier is effected with a high degree of precision. High-resolution paper advance control units are however known from the art.

Thus, the method according to the invention combines the advantages of engraved character printing (high speed) with those of raster dot printing (images, graphics, programmable characters).

Needless to say, the method also permits pure raster dot printing, for which purpose type bands comprising only dot characters are required.

The disadvantage of printing, for example, closely adjacent or overlapping dots, for which purpose a small hammer spacing has to be tolerated, may be overcome by a special design of the hammer impact faces and the type band (FIGS. 13, 14A, 14B).

FIG. 13 is a sectional perspective view of three print hammers 131, 132, 133 of a print hammer bank. The operating direction of the print hammers is marked by an arrow F. The impact face of a print hammer is other than rectangularly shaped. In the embodiment according to FIG. 13 the impact face of the print hammer may be conceived of as having been derived from a rectangle by an upper portion 131-1 of the latter being displaced to the right relative to the lower portion 131-2 such that the former extends beyond the lower portion 140-2 of the stepped gap 140-1/140-2 between the adjacent hammers 131 and 132. The other print hammers are shaped in the same way as print hammer 131. It is pointed out that other embodiments of the hammer impact faces are equally conceivable; the impact faces may be designed, for example, as parallelograms, with an oblique spacer gap between adjacent print hammers.

The special design of the print hammers is to ensure gapless dot printing. To that end, a type band 20 is used which comprises a lower row 20-10 and an upper row 20-20 of dot characters. In addition, the band is provided with the usual engraved characters, of which E and C are shown (mirror-inverted). It is assumed that type band 20, a sectional view of which is shown in FIG. 13, is moved in the direction D past the print hammers. By suitably activating the print hammers 131, 132, 133 it is possible to print a dot row 150 (FIG. 14A) on a record carrier 140. For printing the dot row 150, the lower row of the dot characters 20-10 on the type band is used. The dots are printed by the lower portions of the print hammers, say, 131-2. It is also assumed that the dot group 150-1 of print hammer 131, the dot group 150-2 of print hammer 132 and the dot group 150-3 of print hammer 133 are to be printed. The gaps remaining between the dot groups 150-1 and 150-2 and 150-2 and 150-3, respectively, are due to the spacing of print hammers 131/132 and 132/133, respectively. To fill these undesired gaps with dots, the record carrier 140 is advanced by P after the first dot row 150 has been printed. As a result, dot row 150 assumes a position in which it is aligned with the upper dot row 20-20 of the type band 20. Subsequently, dots 151, 152 are printed in the remaining gaps of the dot row 150 by printing the dot characters of the upper dot row of the type band by the upper portion of the print hammers, say, 131-1. This print operation is performed by the portion 131-11 extending beyond the operating gap 140-2 between the adjacent print hammers 131, 132. This portion 131-11 thus serves to print a dot which because of the spacer gap 140-2 between print hammers 131, 132 could not be printed in the first print cycle, during which the dot row 150 was printed.

After dots 151 and 152 have been printed in the gaps of row 150, the complete print line 160 is available (FIG. 14B).

It is pointed out that left- or right-shifting permits varying the position of the dots to be printed and that, provided suitable control means are used, it is also possible to print overlapping dots (in particular for producing greytone images).

I claim:

1. Method for controlling line printers comprising a revolving type carrier which is moved past a row of print elements arranged in a bank and associated with the print positions of a print line, for precalculating the actuation times Tf of the print elements for printing particular characters at particular print positions of a record carrier at said print line, using a type carrier with equidistantly spaced scannable time marks and a reference mark, and characterized in that the spacing of the characters on the type carrier (400) relative to the reference mark (501) equals a coarse time raster value (ΔT) or an integral multiple thereof, that the coarse time raster value is derived from the time mark pitch, with the time marks (402) having specific coarse time raster values, that the pitch of the print elements in the bank differ and the spacing of a print position from a reference print posiiton (H1) equals a coarse time raster value (ΔT) or a multiple thereof and an additional fine time raster value (Δt) or a multiple thereof, the coarse and fine time raster values being defined as coarse and fine time raster values relative to the number of revolutions of the type carrier (400), that the fine time raster values of the print elements are sorted according to the fine time raster values of their spacing from the reference print position and their actutation times (Tf) are calculated in the order of the print elements resulting from that sort step, and that the actuation time of a print element at the nth print position Hn (n=1, 2, 3, 4, ...) for printing the pth character Cp (p=1, 2, 3, 4, ...) on the type carrier with the characters being consecutively numbered relative to othe reference mark (501) and the print positions being consecutively numbered relative to the reference print position (H1) is calculated according to the relation $$Tf = TCp - THn$$

for a positive difference value TCF−THn $$Tf = TC \text{ Band} + (TCp - THn)$$

for a negative difference value TCp−THn
which is subtracted from TC Band, where TC band is the time required for one revolution of the band and TCp is the time that passes as the pth character moves from its respective momentary position to the reference print position (H1), and where THn is the time that passes as the type band moves from the nth print position Hn to the reference print position (H1), and where T Home is the time that passes as the reference mark (501) moves from its respective mommetary position to the reference print position (H1), and that a first table FTABC (600) and a second table FTABF (700) are generated, the first table (600) comprising a field for each possible coarse raster time value in an ascending order, and the second table (700) comprising a row field (700 ΔT5) associated with each coarse raster time value of the first table (600) and consisting of several subfields (700 ΔT5-1, 700 ΔT5-2), and that after calculation of the actuation time of a print element, an entry for the coarse time raster value of the calculated actuation time is made in the associated field of the table (600) for the print operation to be performed later on, and for the fine time raster value of the calculated actuation time an entry on the print position number and the fine time raster value for the print operation to be performed later on is made in the next free subfield of the row field associated with the coarse time raster, and that for printing a line, the fields of the first table (600) are addressed in the ascending order of the coarse time raster values, and that in the event of a coarse time raster table field entry for a print operation to be performed a branch is taken to the row field of the second table (700) associated with that coarse time value, printing the print positions defined therein in the order of the fine time raster values at a time obtained by adding the coarse time raster value and the respective fine time raster value.

2. Method according to claim 1, characterized in that changing the coarse time raster values (TCi) causes the characters to be printed left- or right-shifted from their original print position.

3. Method according to claim 2, characterized in that changing the fine time raster values prior to sorting the print elements according to the fine time raster values causes flight time variations of the print elements to be compensated for.

4. Method according to claim 3, characterized in that by using a type carrier with a plurality of dots and engraved characters as a type band, a dot raster/engraved characterer print output is obtained.

5. Method according to claim 3, characterized in that by using a type carrier with a plurality of dots as a type band, a dot raster print output is obtained.

6. Method according to claim 5, characterized by overlapping and/or non-overlapping dot printing.

7. Arrangement for implementing the method according to claim 6 for gapless dot printing, characterized in that the type band (20) comprises two tracks (20-10, 20-20) of dot characters, the first track of which in a first print cycle serves to print a dot row with gaps caused by the mutual spacing of the print elements (131, 132, 133), and the second track of which after advance of the record carrier by a value corresponding to the track spacing (P) serves to fill the dot gaps, the impact faces of the print elements (131, 132, 133) comprising two impact regions (131-2; 131-11) for the first and the second track, which are staggered relative to each other.

8. Arrangement for implementing the method according to claim 7 for gapless dot printing, characterized in that for gap-free dot raster printing the print elements are designed as print hammers (131, 132, 133) such that adjacent impact faces have an oblique stepped or similarly shaped spacer gap (140-2, 140-1) extending substantially obliquely to the line direction, and that an assumed plane extending transversely to the line direction and perpendicularly to the impact face of a print hammer intersects the impact face of one of the two adjacent print hammers in a partial region of the spacer gaps, that a first and a second track (20-10, 20-20) of dot characters is provided on the type band (20), and that a dot line (160) is printed on the record carrier (140) in a first and a second print cycle, printing in the first print cycle, by means of the first dot character track (20-10) and the lower portion (131-2) of the print hammer impact faces, a dot line (150) having gaps in the region of the spacer gaps between adjacent print hammers, and, after the record carrier has been advanced transversely to the line direction by an amount (P) corresponding to the spacing of the dot character tracks, filling said gaps with dots by means of the second dot character track and the upper portion of the print hammer impact faces (131-1).

9. Type band for implementing the method according to claim 1, characterized in that broad adjacent characterers on the type band have a greater spacing from one character centerline to another than narrower characters.

* * * * *